Sept. 30, 1924.

S. G. DOWN 1,509,937

BRAKE COOLING DEVICE

Filed Feb. 11, 1922

INVENTOR
SIDNEY G. DOWN
BY *Wm. M. Cady*
ATTORNEY

Patented Sept. 30, 1924.

1,509,937

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-COOLING DEVICE.

Application filed February 11, 1922. Serial No. 535,764.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Cooling Devices, of which the following is a specification.

This invention relates to automotive brakes and the principal object of the invention is to provide means for cooling the brake drums and brake bands.

Figure 1:
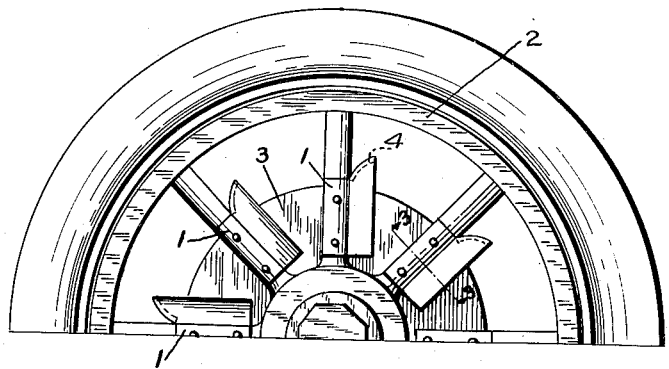
Figure 2:
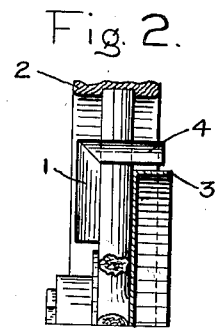
Figure 3:
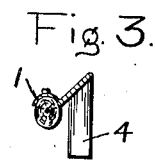
Figure 4:
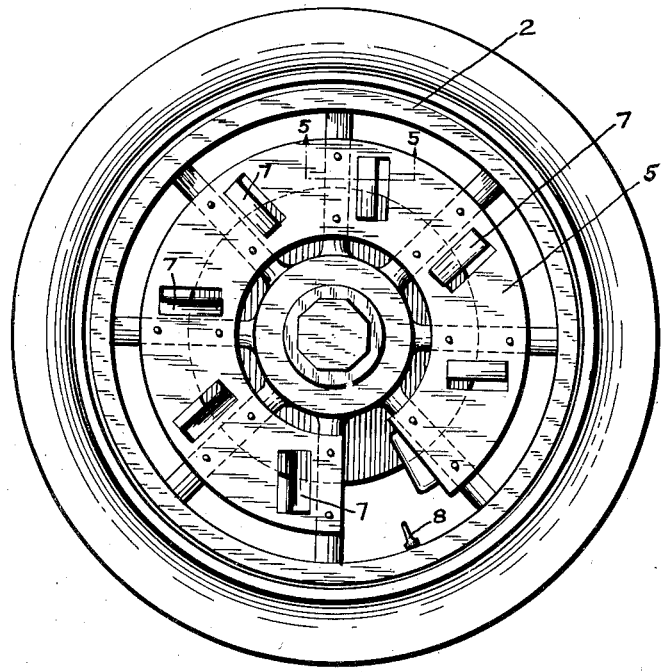
Figure 5:
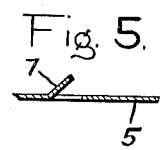

In the accompanying drawing; Fig. 1 is a side elevation of a portion of a motor vehicle wheel, showing the brake drum cooling means applied thereto; Fig. 2 a front elevation of the wheel, broken away to show the cooling means; Fig. 3 a section on the line 3—3 of Fig. 1; Fig. 4 a side elevation of a motor vehicle wheel showing a modified form of my invention applied thereto; and Fig. 5 a section on the line 5—5 of Fig. 4.

According to the construction as shown in Figs. 1, 2, and 3, an individual fan blade 1 is secured to each spoke of the usual motor vehicle wheel 2. The construction and angularity of the blades 1 is such that air is deflected so as to impinge on the brake drum 3, as the vehicle wheel revolves, and preferably a laterally extending vane 4 is provided on each fan blade 1, which extends over the blade drum and assists in directing the air currents against the brake drum and the brake bands.

In Fig. 4 is shown a modified form of my invention, in which a disk 5 is secured to the spokes of the wheel and slots 6 are cut in the disk adjacent to each spoke. As the slots are cut, the material displaced is bent out so as to form fan blades 7. The disk 5 may be cut away adjacent to the tire valve 8, so as not to interfere with the operation of inflating the tire.

Having now described my invention, what I claim as new and desire to secure by Letters Patent, is:—

1. The combination with a motor vehicle wheel having a brake drum, of radially disposed fan blades associated with the wheel and axially extending vanes for generating and deflecting air currents to the brake drum.

2. The combination with a motor vehicle wheel having a brake drum, of radially disposed fan blades associated with the wheel and axially extending vanes associated with said fan blades for directing air currents to the brake drum.

In testimony whereof I have hereunto set my hand.

SIDNEY G. DOWN.